(12) United States Patent
Oba

(10) Patent No.: US 10,451,711 B2
(45) Date of Patent: Oct. 22, 2019

(54) WAVE ENERGY RADIATING APPARATUS

(71) Applicant: Mitsubishi Electric Corporation, Tokyo (JP)

(72) Inventor: Tetsuya Oba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 326 days.

(21) Appl. No.: 15/345,899

(22) Filed: Nov. 8, 2016

(65) Prior Publication Data

US 2017/0315210 A1    Nov. 2, 2017

(30) Foreign Application Priority Data

Apr. 28, 2016   (JP) .................................. 2016-090514

(51) Int. Cl.
| | | |
|---|---|---|
| *G01S 7/03* | (2006.01) | |
| *G01S 13/93* | (2006.01) | |

(Continued)

(52) U.S. Cl.
CPC .............. *G01S 7/03* (2013.01); *G01S 13/931* (2013.01); *H01Q 1/3233* (2013.01); *H01Q 1/38* (2013.01);
(Continued)

(58) Field of Classification Search
CPC . G01S 7/03; G01S 7/40; G01S 7/4026; G01S 7/4004; G01S 13/931; G01S 13/426; G01S 2013/9371; H01Q 1/1235; H01Q 1/1264; H01Q 1/32; H01Q 1/3233; H01Q 1/38; H01Q 1/42; H01Q 3/00; H01Q 3/02; H01Q 3/06; H01Q 3/08; H01Q 3/10; H01Q 3/12; H01Q 3/1214; H01Q 3/125;
(Continued)

(56) References Cited

U.S. PATENT DOCUMENTS

| | | | | |
|---|---|---|---|---|
| 5,926,127 A | * | 7/1999 | Schmidt .................. | G01S 7/032 342/175 |
| 5,959,669 A | * | 9/1999 | Mizoguchi ........... | H04N 5/2251 348/342 |

(Continued)

FOREIGN PATENT DOCUMENTS

JP    2000-165130 A    6/2000

*Primary Examiner* — Bernarr E Gregory
*Assistant Examiner* — Daniel P Malley, Sr.
(74) *Attorney, Agent, or Firm* — Sughrue Mion, PLLC; Richard C. Turner

(57) ABSTRACT

The radiation-direction changing and maintaining portion includes: a linear-movement generator, which is provided on a surface of a wave energy radiating portion opposite to a surface of the wave energy radiating portion from which the wave energy is radiated, and is configured to generate power required to change the direction of radiation of the wave energy radiating portion linearly along the wave energy radiating portion; a direction changer, which is provided so as to face the linear-movement generator, and is configured to change a direction of the power generated by the linear-movement generator toward the wave energy radiating portion to turn the wave energy radiating portion; and a force applying member configured to apply a force to the wave energy radiating portion in a direction against the turning of the wave energy radiating portion, which is caused by the power.

6 Claims, 7 Drawing Sheets

(51) Int. Cl.
    *H01Q 1/32*         (2006.01)
    *H01Q 1/38*         (2006.01)
    *H01Q 1/42*         (2006.01)
    *H01Q 3/06*         (2006.01)
    *H01Q 3/08*         (2006.01)
    *G01S 13/42*       (2006.01)

(52) U.S. Cl.
    CPC ............... *H01Q 1/42* (2013.01); *H01Q 3/06*
        (2013.01); *H01Q 3/08* (2013.01); *G01S 13/426*
        (2013.01)

(58) Field of Classification Search
    CPC ...... H01Q 3/1257; H01Q 3/1264; H01Q 3/16;
        H01Q 3/18; H01Q 3/20; H01Q 3/32;
        H01Q 13/02; H01Q 13/06; H01Q 7/00;
        H01Q 1/125; H01Q 3/04; H04W 16/28
    See application file for complete search history.

(56) References Cited

U.S. PATENT DOCUMENTS

| | | | | |
|---|---|---|---|---|
| 6,208,046 | B1* | 3/2001 | Lee | F16C 17/08 310/49.01 |
| 6,947,091 | B1* | 9/2005 | Widmann | G02B 7/102 348/240.99 |
| 2003/0068198 | A1* | 4/2003 | Kozlovski | H01Q 1/1214 403/372 |
| 2007/0089697 | A1* | 4/2007 | Hara | F02D 35/023 123/90.15 |
| 2007/0157519 | A1* | 7/2007 | Nien | E06B 7/086 49/74.1 |
| 2007/0241979 | A1* | 10/2007 | Yang | H01Q 1/246 343/765 |
| 2008/0136719 | A1* | 6/2008 | Kim | H01Q 1/42 343/713 |
| 2010/0045555 | A1* | 2/2010 | Ryou | H01Q 3/01 343/757 |
| 2011/0050525 | A1* | 3/2011 | Sanada | H01Q 1/3233 343/760 |
| 2013/0169495 | A1* | 7/2013 | Tsai | H01Q 3/02 343/757 |
| 2013/0317684 | A1* | 11/2013 | Kaneko | E02F 9/2075 701/22 |
| 2015/0059500 | A1* | 3/2015 | Conrad | H01Q 1/125 74/89.14 |
| 2017/0077585 | A1* | 3/2017 | Oxford | H01Q 1/1257 |
| 2017/0179566 | A1* | 6/2017 | Hirabe | H01Q 1/1257 |

\* cited by examiner

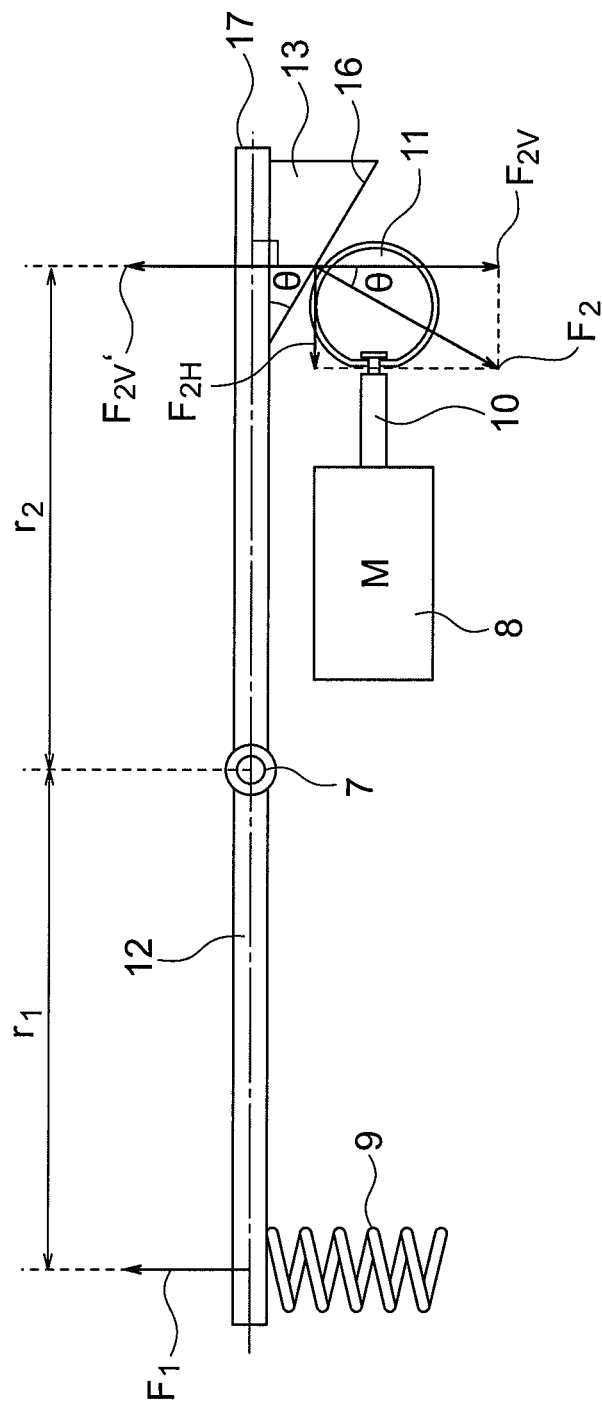

WAVE ENERGY RADIATING APPARATUS

BACKGROUND OF THE INVENTION

1. Field of the Invention

The present invention relates to a wave energy radiating apparatus configured to adjust, for example, an angle of a direction of radiation from a high-frequency antenna board.

2. Description of the Related Art

Hitherto, there has been known a radar antenna swinging apparatus including a link mechanism that is provided so that a swinging core of a radar antenna and a motor shaft are away from each other. In the radar antenna swinging apparatus, while a motor is making one turn, the antenna moves for one swing cycle (see Japanese Patent Application Laid-open No. 2000-165130).

However, the radar antenna swinging apparatus described above uses the link mechanism to adjust an angle of the antenna, and therefore has a problem in an increased apparatus size.

SUMMARY OF THE INVENTION

The present invention has been made to solve the problem described above, and provides a wave energy radiating apparatus capable of reducing an apparatus size.

In order to achieve the above-mentioned object, according to one embodiment of the present invention, there is provided a wave energy radiating apparatus, including: wave energy radiating means for radiating wave energy into a space; and radiation-direction changing and maintaining means for turning the wave energy radiating means to change a direction of radiation of the wave energy radiating means, and for maintaining a changed attitude of the wave energy radiating means, the radiation-direction changing and maintaining means including: a linear-movement generator, which is provided on a surface of the wave energy radiating means opposite to a surface of the wave energy radiating means from which the wave energy is radiated, and is configured to generate power required to change the direction of radiation of the wave energy radiating means linearly along the wave energy radiating means; a direction changer, which is provided so as to face the linear-movement generator, and is configured to change a direction of the power generated by the linear-movement generator toward the wave energy radiating means to turn the wave energy radiating means; and a force applying member configured to apply a force to the wave energy radiating means in a direction against the turning of the wave energy radiating means, which is caused by the power, the linear-movement generator including a motor, a shaft configured to linearly reciprocate via a mechanism configured to convert turning movement of a rotor of the motor into linear movement, and a movable portion provided to a distal end portion of the shaft, in which the movable portion includes a cylindrical body, in which a cutout groove is formed at the distal end portion of the shaft, and in which the shaft is hooked to a gap generated between both end portions of the cylindrical body so that the both end portions of the cylindrical body are fitted into the cutout groove.

According to the wave energy radiating apparatus of the present invention, the linear-movement generator is configured to generate the power required to change the direction of radiation from the wave energy radiating means linearly along the wave energy radiating means. Thus, the apparatus can be reduced in size.

BRIEF DESCRIPTION OF THE DRAWINGS

FIG. 8 is a view for illustrating a load applied to a board case illustrated in FIG. 1 according to Embodiment 1.

DETAILED DESCRIPTION OF THE PREFERRED EMBODIMENTS

Now, a description is given of an in-vehicle radio-wave radar apparatus according to an embodiment of the present invention with reference to the accompanying drawings, and throughout the drawings, like or corresponding members and parts are denoted by like reference symbols to describe those components.

Embodiment 1

Figure 1:
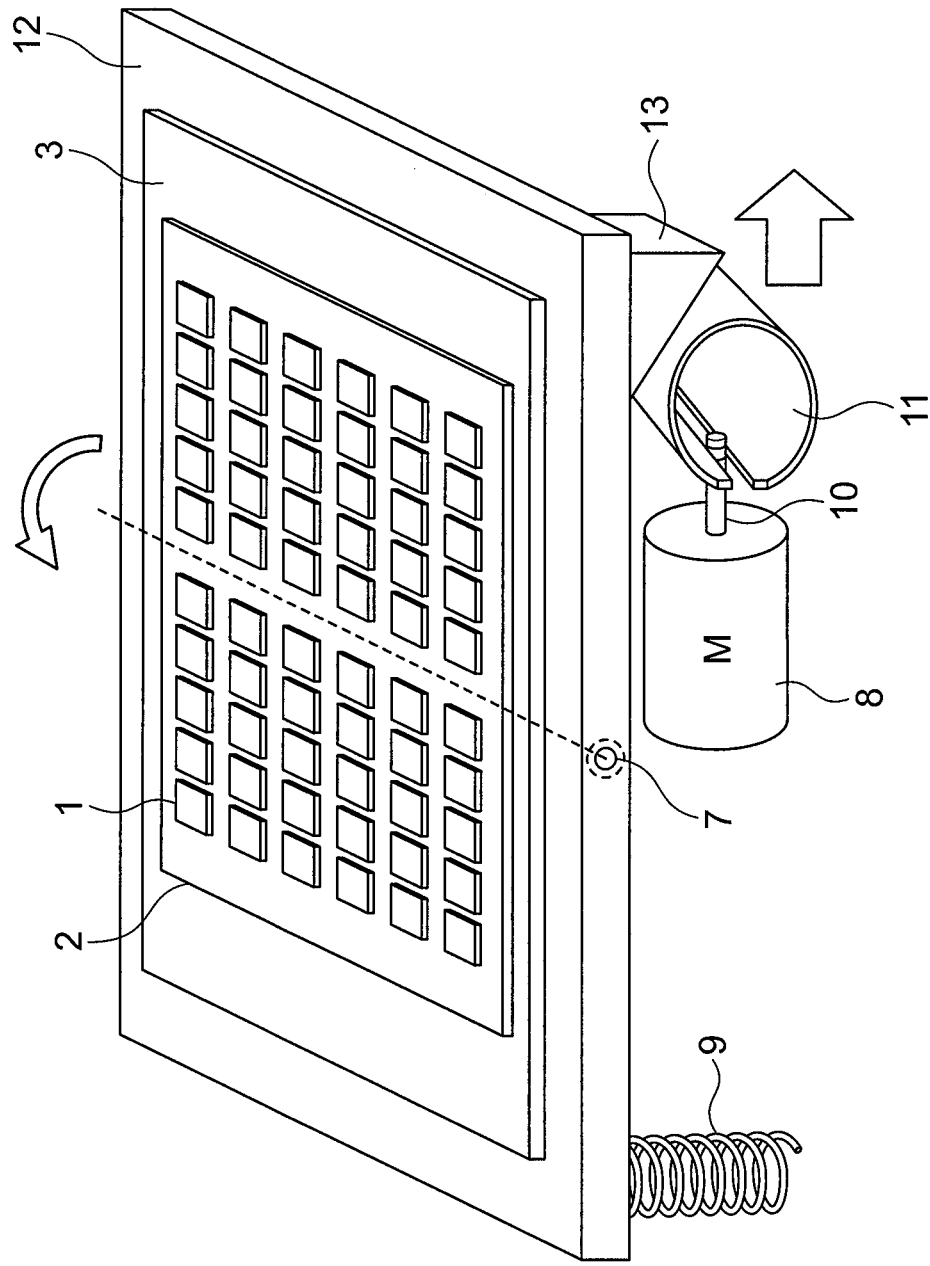
FIG. 1 is a perspective view for illustrating a main part of an in-vehicle radio-wave radar apparatus according to Embodiment 1 of the present invention.
Figure 2:
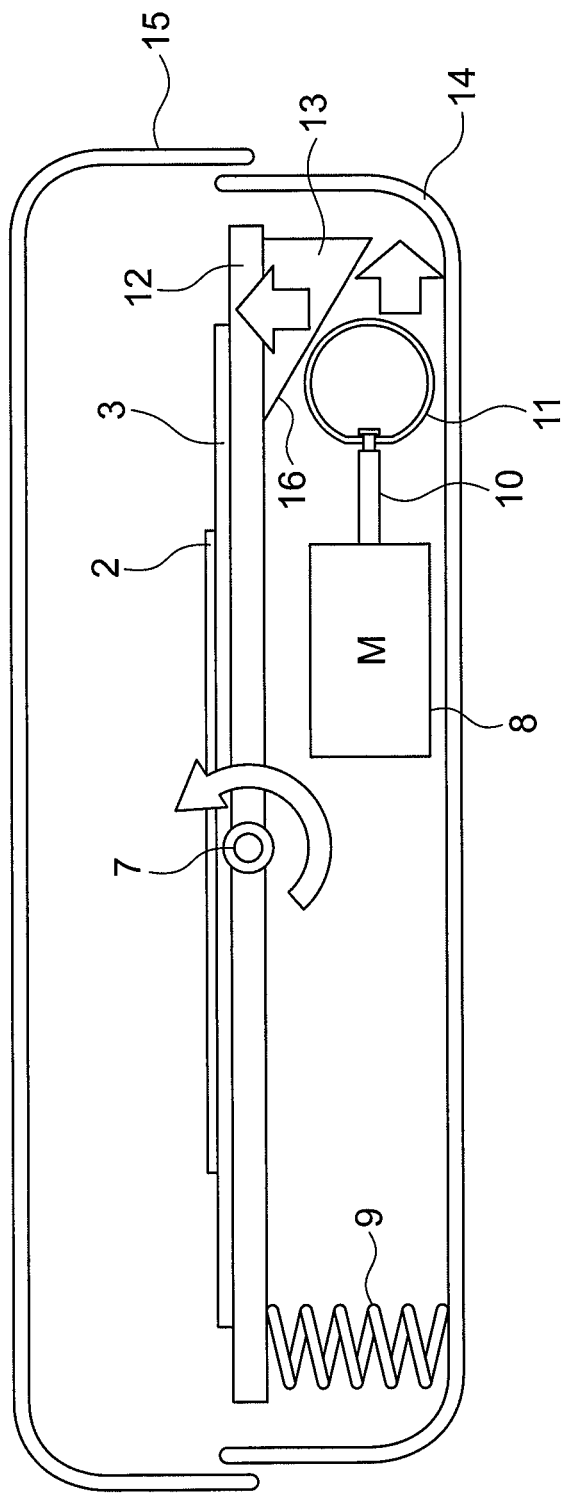
FIG. 2 is a side sectional view of FIG. 1.

FIG. 1 is a perspective view for illustrating a main part of an in-vehicle radio-wave radar apparatus according to Embodiment 1 of the present invention, and FIG. 2 is a side sectional view of FIG. 1.

For the radio-wave radar apparatus, when a detection area for a target object is intended to be expanded, a radio-wave radiation pattern is required to be narrowed to form a sharper beam by increasing an aperture diameter of an antenna configured to radiate a radio wave so that enhancement of sensitivity of the antenna is achieved.

For the in-vehicle radio-wave radar apparatus, in particular, an antenna gain in a downward direction in which a road surface is present is required to be suppressed so as not to detect a reflected wave from the road surface or the like, which may become an obstacle to detect a target such as a vehicle running ahead or a pedestrian. At the same time, a high antenna gain in a front direction in which the target to be originally detected is present is required to be ensured. Therefore, it is common to provide sharp radiation directivity in a perpendicular plane so as to achieve the suppression of the antenna gain in the downward direction and the high antenna gain in the front direction.

Therefore, in the in-vehicle radio-wave radar apparatus that requires high detection reliability, a maximum radiation direction of the radio wave, specifically, a so-called beam direction, is required to be constantly oriented in a direction in which the target (such as a vehicle running ahead or a pedestrian) to be detected is present. Thus, there is a need for a correcting function, that is, an axis adjustment mechanism configured to direct the maximum radiation direction of the radio wave to the front direction corresponding to a desired beam direction, not only when an error is generated at the time of mounting of the radar but also when an error is generated due to a shock applied on a vehicle body after the mounting of the radar.

The in-vehicle radio-wave radar apparatus according to Embodiment 1 includes an antenna 1. The antenna 1 is formed on a board surface layer of a high-frequency antenna board 2 that is wave energy radiating means (wave energy radiating portion) by using etching or the like. The high-frequency antenna board 2 is bonded onto a common printed board 3 on which electronic circuits are mounted. The printed board 3 onto which the high-frequency antenna board 2 is bonded is fixed to a board case 12 having a rectangular shape. The board case 12 is configured to hold and accommodate the printed board 3 and to change and drive an angle of the printed board 3.

The antenna 1, which is a radio-wave radiating source, includes a plurality of antenna elements arranged in an array pattern on the board surface layer of the high-frequency antenna board 2. Each of the antenna elements is electrically excited, thereby radiating a radio wave into a space.

Thus, a maximum radiation direction, that is, a beam direction of the radio wave radiated from the antenna 1 approximately matches board normal directions of both the high-frequency antenna board 2 and the printed board 3.

As a method of fixing the printed board 3 to the board case 12 that is accommodated in a space formed between a radar apparatus casing 14 and a front resin cover 15, screw clamping is common. However, the printed board 3 may be bonded to the board case 12 by using an adhesive, and therefore fixing means is not limited to that described above.

The in-vehicle radio-wave radar apparatus according to Embodiment 1 has the maximum radiation direction, that is, the beam direction of the radio wave radiated from the antenna 1 that approximately matches the board normal directions of both the high-frequency antenna board 2 and the printed board 3. Thus, an axis deviation occurs in the beam direction of the radio wave under the effects of a bonding error of the high-frequency antenna board 2 to the printed board 3, an assembly error of the printed board 3 to the board case 12, a mounting error of the radio-wave radar apparatus in an automobile, or the like.

As means for eliminating the generated axis deviation described above, a bracket mechanism itself, which is configured to mount the in-vehicle radio-wave radar apparatus to a vehicle, can include an axis adjustment mechanism. In this case, however, a worker is required to directly touch a mounting bracket for the radar to make adjustment by using an adjustment tool after the radar is mounted in the vehicle.

For the reason described above, a location at which the radar can be mounted in the vehicle is limited. In addition, a large number of mounting steps including the adjustment by the worker are required. Thus, mounting costs disadvantageously increase.

Therefore, in the in-vehicle radio-wave radar apparatus according to Embodiment 1, the axis adjustment mechanism is included in the radio-wave radar apparatus, which is capable of adjusting the axis easily after the mounting of the radar in the vehicle so as to keep low mounting costs including those for the axis adjustment.

The in-vehicle radio-wave radar apparatus according to Embodiment 1 includes, as the axis adjustment mechanism, radiation-direction changing and maintaining means for turning the high-frequency antenna board 2 to change the direction of radiation from the high-frequency antenna board 2, and for maintaining a changed attitude of the high-frequency antenna board 2.

The radiation-direction changing and maintaining means includes a linear-movement generator, a direction changer, and a compression spring 9. The linear-movement generator is provided on a surface of the high-frequency antenna board 2 opposite to a surface thereof from which wave energy is radiated, and is configured to generate power required to change the attitude of the high-frequency antenna board 2 linearly along the high-frequency antenna board 2. The direction changer is provided so as to face the linear-movement generator, and is configured to change a direction of the power generated by the linear-movement generator toward the high-frequency antenna board 2 to turn the high-frequency antenna board 2. The compression spring 9 is a force applying member configured to apply a force to the high-frequency antenna board 2 in a direction against the turning of the high-frequency antenna board 2, which is caused by the power.

The linear-movement generator includes a stepping motor 8, a shaft 10, and a cylindrical body 11. The shaft 10 is configured to move linearly in a reciprocating manner via a mechanism configured to convert turning movement of a rotor of the stepping motor 8 into linear movement. The cylindrical body 11 is a movable portion provided to a distal end portion of the shaft 10.

The direction changer is a protruding portion 13 provided to one end portion of the board case 12. The protruding portion 13 is a direction changing portion configured to change a direction of the power transmitted via the cylindrical body 11 through the shaft 10 to a direction for turning the board case 12 about turning center portions 7 of the board case 12 as a center. The protruding portion 13 has a slope 16 facing the cylindrical body 11.

Although not illustrated in FIG. 1 and FIG. 2 because only a conceptual description is given herein, the turning center portions 7 may be formed by forming a hole portion in the radar apparatus casing 14 so as to be integral therewith and forming a hole portion in the board case 12 so that the hole portions are opposed to each other, and inserting the same pin member into both of the hole portions. Alternatively, the turning center portions 7 may be formed by placing the board case 12 on a protruding portion formed on a surface of the radar apparatus casing 14.

Thus, the turning center portions 7 are provided to a set of opposite sides of the board case 12. An attitude of the board case 12 and even an attitude of the high-frequency antenna board 2 are angularly displaced about a line (indicated by the broken line in FIG. 1) that connects both the turning center portions 7 as a turning axis.

Further, the board case 12 is fixed to or is held in contact with the radar apparatus casing 14 via the turning center portions 7. The stepping motor 8 is fixed to the radar apparatus casing 14 by using a bracket mechanism or the like.

In the above-mentioned in-vehicle radio-wave radar apparatus, motor power output from the stepping motor 8 through the shaft 10 is input to the protruding portion 13 provided to the board case 12 via the cylindrical body 11 to cause the board case 12 to be turned.

Meanwhile, on the side of the board case 12, which is opposite to the side where the protruding portion 13 is formed across the turning center portions 7, the compression spring 9 is arranged as described above. A reaction force of a spring load of the compression spring 9 is input to the board case 12 so as to cause the board case 12 to be turned in a direction opposite to the motor power.

As a result, the above-mentioned two loads that are input to the board case 12 respectively cause the board case 12 to be turned in the directions opposite to each other. The amounts of the two loads are in equilibrium, and therefore the board case 12 can maintain an attitude state and an angle in the turning direction after the axis adjustment.

Further, the cylindrical body 11 is pushed out in a thrust direction of the shaft 10 by the motor power output from the stepping motor 8 through the shaft 10. As a result, the cylindrical body 11 pushes the protruding portion 13 of the board case 12 via the slope 16. A load applied from the cylindrical body 11 to the board case 12 is converted by the slope 16 into a load vector that causes the board case 12 to be turned.

Therefore, in the in-vehicle radio-wave radar apparatus of this embodiment, the stepping motor 8 is arranged in parallel to the board case 12, that is, the stepping motor 8 is arranged in a direction that does not allow the stepping motor 8 to directly turn the board case 12, as illustrated in FIG. 2. As described above, however, the motor power is converted by the slope 16 of the protruding portion 13 into the load in the direction that allows the board case 12 to be turned. As a result, the attitude of the board case 12 can be displaced.

Therefore, the attitude of the board case 12 can be displaced while the stepping motor 8 is installed in parallel to the board case 12. Thus, the apparatus can be reduced in size.

Next, reference examples are described. Excellent features of the axis adjustment mechanism of Embodiment 1 are described in comparison to the reference examples.

Figure 6:
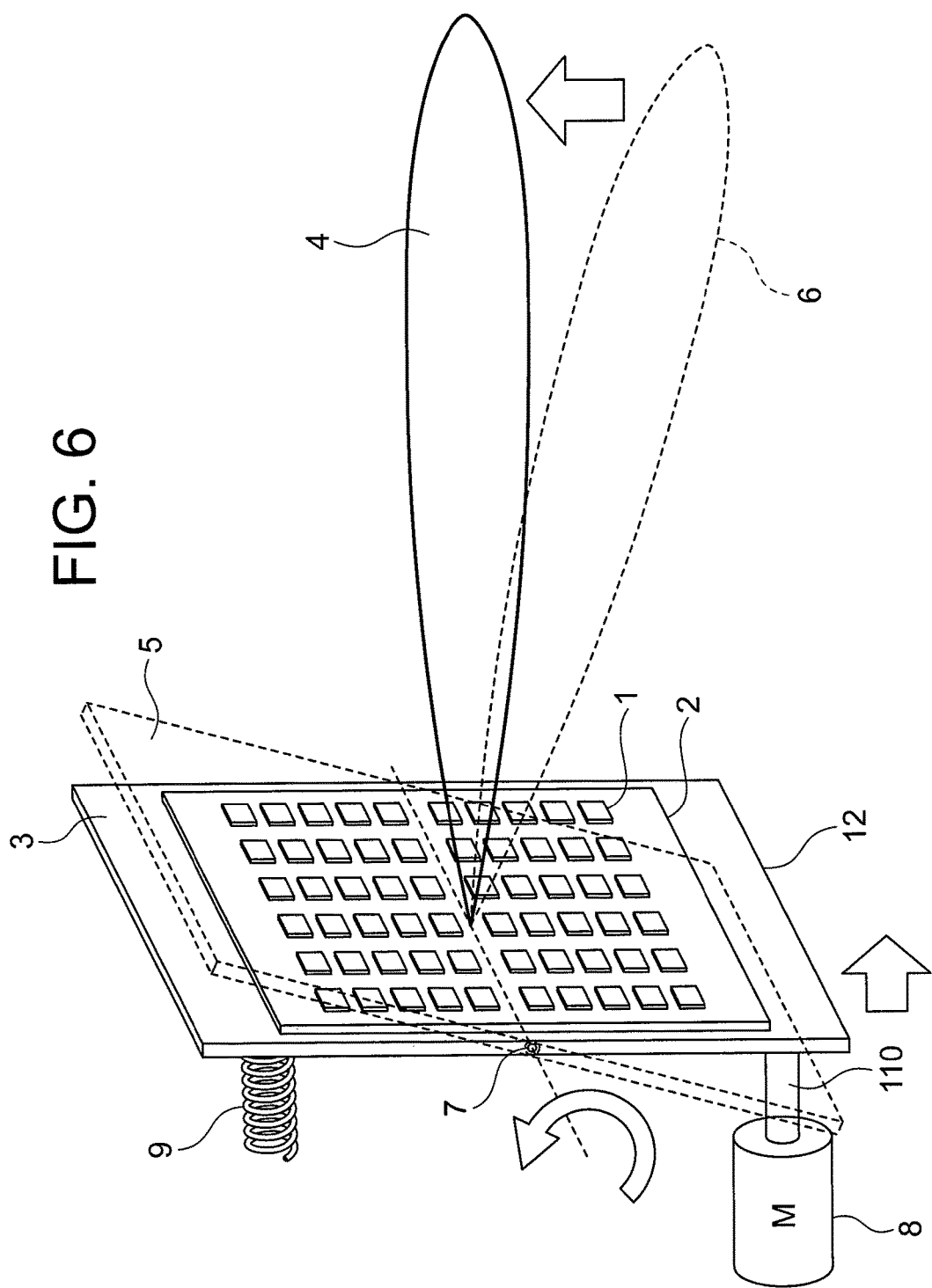
FIG. 6 is a perspective view for illustrating a main part of a radio-wave radar apparatus as a first reference example.

FIG. 6 is a perspective view for illustrating a main part of a radio-wave radar apparatus as a first reference example.

In the reference example, the printed board 3 to which the high-frequency antenna board 2 is bonded is accommodated and held in the board case 12. The stepping motor 8 is provided to one end portion of the board case 12, which is on the side opposite to the side where the printed board 3 is bonded. A shaft 110 of the stepping motor 8 extends in a direction perpendicular to the surface of the board case 12, and has a distal end portion fixed to the board case 12. A pair of the compression springs 9 is provided between the board case 12 and the radar apparatus casing 14.

The stepping motor 8 is in a state in which the distal end portion of the shaft 110 thereof is held in indirect contact with the printed board 3 through the intermediation of the board case 12 to push the printed board 3. Further, on the opposite side across the turning center portions 7, the compression springs 9 configured to maintain the attitude of the printed board 3 are arranged. With the compression springs 9, the load input to the printed board 3 and the load input to the board case 12 are in equilibrium. Therefore, a stationary state is maintained.

In the reference example, when the stepping motor 8 is actuated to extend the shaft 110, a lower portion of the printed board 3 with respect to the turning center portions 7 is displaced in a radio-wave radiation direction by the load received from the shaft 110. As a result, the attitude of the printed board 3 is angularly displaced upward.

Further, when the stepping motor 8 is actuated in the opposite direction to shorten the shaft 110, the shaft 110 moves away from the board 3. Hence, an upper portion of the printed board 3 with respect to the turning center portions 7 is displaced in the radio-wave radiation direction by the load received from the compression springs 9. As a result, the attitude of the printed board 3 is angularly displaced downward.

In the manner described above, the linear movement of the shaft 110 is converted into the turning movement of the printed board 3 about the turning center portions 7 as the center of turning, that is, into change in attitude of the antenna 1.

Therefore, in the axis adjustment mechanism described above, the attitude of the printed board 3 is angularly offset by a necessary amount by the driving of the stepping motor 8. As a result, the axial adjustment on a beam direction of the radio wave radiated from the antenna 1 to a desired beam direction 4 is achieved.

In FIG. 6, the desired beam direction 4 of the radio wave is illustrated. Further, the printed board with the axis deviation is illustrated as a printed board 5 in the broken line, and the beam direction of the radio wave with the axis deviation is illustrated as a beam direction 6 of the radio wave in the broken line.

In the above-mentioned in-vehicle radio-wave radar apparatus provided as the reference example, the distal end of the shaft 110 of the stepping motor 8 is brought into contact with a back surface side of the printed board 3 to directly drive the angle of the printed board 3. Therefore, there can be enjoyed an advantage in achieving the axis adjustment for the radio wave with a simple configuration. However, the above-mentioned in-vehicle radio-wave radar apparatus provided as the reference example has the following problems (A) to (C) because the method of directly driving the angle of the printed board 3 by the stepping motor 8 is employed.

(A) The stepping motor 8 is inevitably arranged perpendicularly to the printed board 3. Thus, the stepping motor 8 is arranged so that a longitudinal direction of the stepping motor 8 is aligned with a thickness direction of the radar casing, which results in increase in casing size.

(B) The angular displacement amount of the printed board 3 is determined based only on a specification (feed amount per step) of the stepping motor 8. Thus, the resolution cannot be increased to be equal to or higher than performance of the stepping motor 8.

(C) The spring reaction force of the compression springs 9 is directly input to the stepping motor 8. Therefore, the load applied to the stepping motor 8 is disadvantageously increased.

Figure 7:
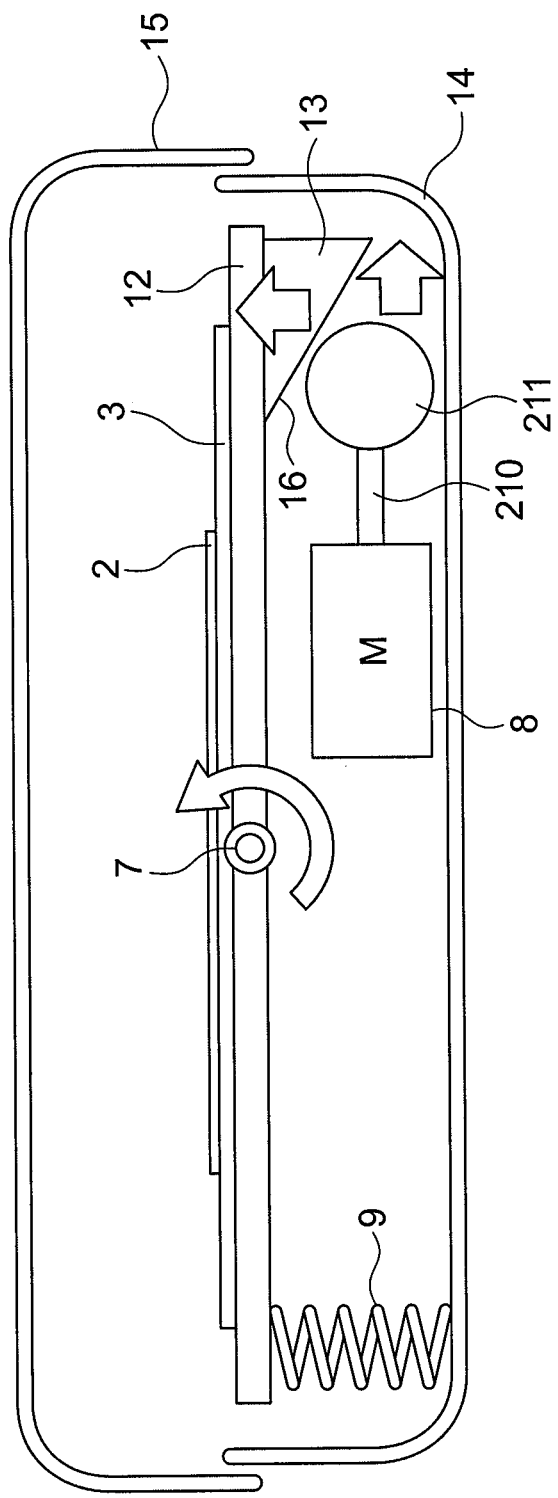
FIG. 7 is a side sectional view of a radio-wave radar apparatus as a second reference example.

Subsequently, a second reference example is described. FIG. 7 is a side sectional view of a radio-wave radar apparatus as the second reference example.

In this reference example, the protruding portion 13 similar to that of Embodiment 1 is provided. A ball 211 (steel ball or SUS ball) is arranged between the protruding portion 13 and a shaft 210. The protruding portion 13 is pressed via the ball 211.

With a method of indirectly driving the board by using the ball as in the second reference example, there can be enjoyed an advantage that the axis adjustment for the radio wave can be achieved with a simple configuration using a general-purpose component such as the steel ball or the SUS ball. However, the above-mentioned method has the following problems (D) and (E) because the ball is separated from and independent of the motor.

(D) Movement of the ball when the motor shaft is shortened depends only on a return force of the springs. Due to a foreign substance caught inside or a flaw generated on a surface of the component (surface of the ball or a component coming in contact with the ball), the ball is not sometimes returned in accordance with shortening of a shaft length of the stepping motor (degraded followability of the ball).

(E) The ball is not fastened to the motor shaft and is simply sandwiched and held between the components (between the board case and the motor shaft) under a force of the springs. Thus, when the radar casing is subjected to a strong shock, there is a fear in that the ball may fall from a predetermined position (fall of the ball).

The axis adjustment mechanism of Embodiment 1 is further described, including advantages of Embodiment 1 over the above-mentioned problems. Similarly to the second reference example, the axis adjustment mechanism is built in the radio-wave radar apparatus in Embodiment 1. However, the axis adjustment mechanism of Embodiment 1 is configured so as to prevent followability from being degraded even when a foreign substance gets caught inside or a flaw is generated on the surface of the component so that there is no fear in that the movable component falls from the predetermined position even when the radar casing is subjected to a strong shock.

The compressor springs 9 are sandwiched and fixed between the board case 12 and the radar apparatus casing 14. The two compressor springs 9 are provided at both corner portions on the same side (on the left in FIG. 1) of the board case with respect to an axis of rotation (indicated by the broken line in FIG. 1) so that one compressor spring 9 is provided at each of the corner portions.

Further, in FIG. 1, the stepping motor 8 includes the shaft 10 having a distal end held in contact with the cylindrical body 11 that is formed into a cylindrical shape by press working as the movable body. Further, the cylindrical body 11 formed into the cylindrical shape by the press working is provided on aback surface side of the board case 12 so as to be held in contact with the protruding portion 13 formed integrally with the board case 12. Further, the slope 16 is formed on a surface of the protruding portion 13, which is held in contact with the cylindrical body 11. The slope 16 is formed so as to form a given angle with respect to a surface of the board case 12.

Figure 3:
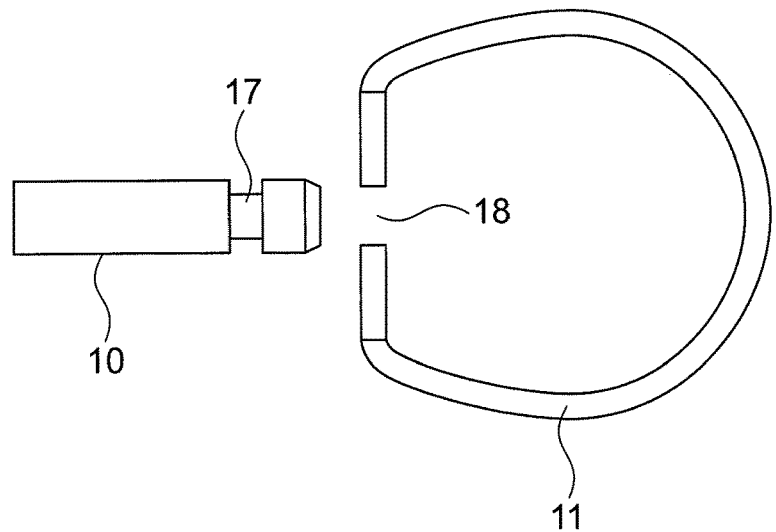
FIG. 3 is a view for illustrating an axis adjustment mechanism illustrated in FIG. 1 in a state before a motor shaft is hooked.
Figure 4:
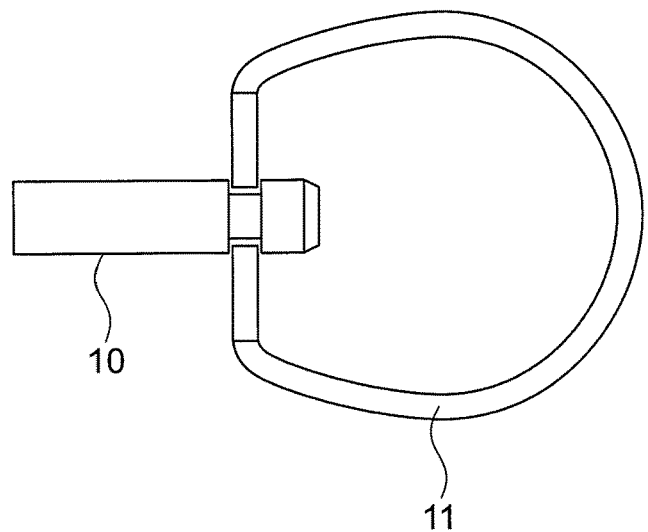
FIG. 4 is a view for illustrating the axis adjustment mechanism illustrated in FIG. 1 in a state after the motor shaft is hooked.
Figure 5:
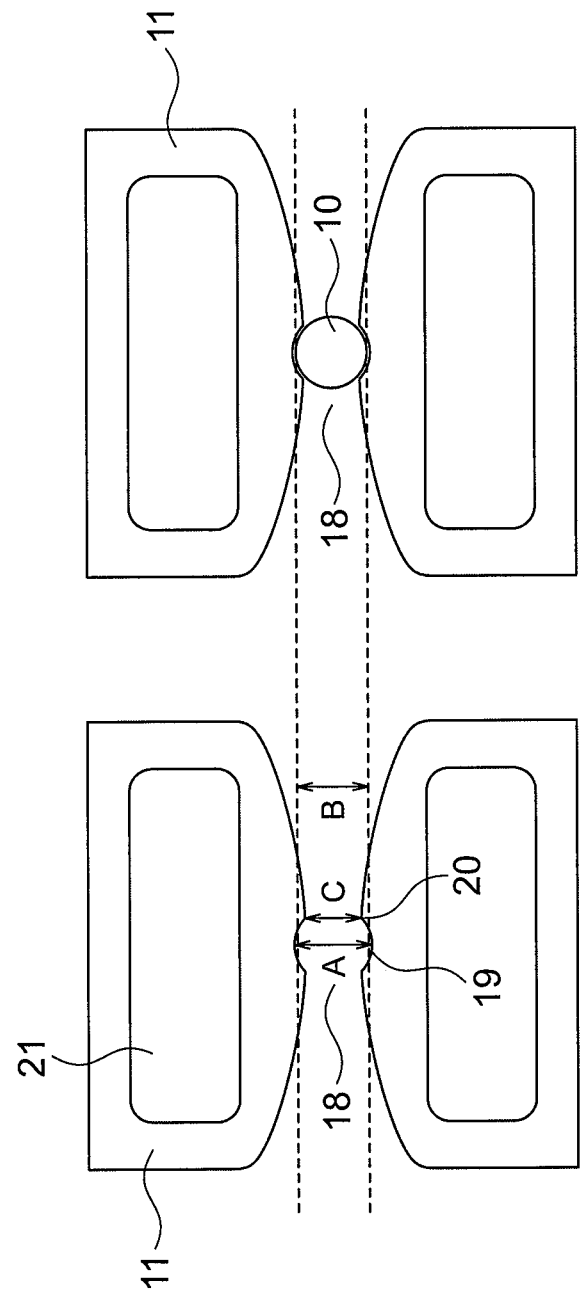
FIG. 5 is a front view of a movable component of the axis adjustment mechanism illustrated in FIG. 1, for illustrating a comparison between the state on the left before the motor shaft is hooked and the state on the right after the motor shaft is hooked.

Next, a relationship between the cylindrical body 11 and the shaft 10 is described. FIG. 3 is a view for illustrating the axis adjustment mechanism illustrated in FIG. 1 in a state before the motor shaft is hooked. FIG. 4 is a view for illustrating the axis adjustment mechanism illustrated in FIG. 1 in a state after the motor shaft is hooked. FIG. 5 is a front view of the movable component of the axis adjustment mechanism illustrated in FIG. 1, for illustrating a comparison between the state on the left before the motor shaft is hooked and the state on the right after the motor shaft is hooked.

For the cylindrical body 11 formed into the cylindrical shape by the press working, a metal plate such as a zinc-plated steel sheet (SECC) having a predetermined sheet thickness (t of about 1.2 mm) is first formed into a strip-like shape having a predetermined width by press working (punching). The strip-like metal sheet is subjected to press working (is bent) into a cylindrical component.

Here, the cylindrical body 11 formed into the cylindrical shape by the press working is formed by bending (press-working) the strip-like metal plate into the cylindrical shape. As a result, as illustrated in FIG. 3, a C-like sectional structure is formed. Both end portions of the cylindrical body 11 are close to each other so as to form a given gap 18 between the both end portions.

Meanwhile, a cutout groove 17 is formed at a distal end portion of the shaft 10 of the stepping motor 8, as illustrated in FIG. 3. The cutout groove 17 is formed in a concentric manner in the vicinity of the distal end portion of the shaft 10 by mechanical work so as to have a predetermined width (required to be at least equal to or larger than the sheet thickness of the cylindrical body 11 formed into the cylindrical shape by the press working).

Next, in Embodiment 1, the cylindrical body 11 and the shaft 10 are not completely fastened. Instead, the shaft 10 is hooked to the cylindrical body 11. As illustrated in FIG. 4, the shaft 10 of the stepping motor 8 is inserted into the gap 18 generated between the both end portions of the cylindrical body 11 so that the cutout groove 17 is sandwiched between the both end portions of the cylindrical body 11. As a result, the shaft 10 is placed in a hooked state.

In the axis adjustment mechanism of Embodiment 1, the shaft 10 of the stepping motor 8 and the cylindrical body 11 formed into the cylindrical shape by the press working are placed in a fastened (hooked) state as illustrated in FIG. 4. Thus, when the stepping motor 8 is driven to extend the length of the shaft 10, a position of the cutout groove 17 formed at the distal end portion of the shaft 10 is displaced in a direction of extension of the motor shaft. Thus, the cylindrical body 11 fastened (hooked) to the shaft 10 by sandwiching the shaft 10 between the both end portions of the cylindrical body 11 is displaced in the direction of extension of the motor shaft (to the right in FIG. 3 and FIG. 4) by a thrust force generated by fitting the cutout groove 17 into the gap 18.

Further, when the stepping motor 8 is driven in the opposite direction to shorten the length of the shaft 10, the position of the cutout groove 17 formed at the distal end portion of the shaft 10 is displaced in a direction of shortening of the motor shaft. Thus, the cylindrical body 11 fastened to the shaft 10 by sandwiching the shaft 10 between the both end portions of the cylindrical body 11 is displaced in the direction of shortening of the motor shaft (to the left in FIG. 3 and FIG. 4) by the thrust force generated by fitting the cutout groove 17 into the gap 18. In this manner, the cylindrical body 11 is displaced with good followability along with the extension and shortening of the shaft 10. Thus, the followability is not degraded unlike the ball method illustrated in FIG. 7. Thus, the board case, and therefore the antenna board are reliably driven along with the drive of the motor.

Therefore, even when a foreign substance gets caught inside or a flaw is generated on the surface of the component, the axis adjustment mechanism (FIG. 3 and FIG. 4) described in Embodiment 1 can be forcibly driven by the thrust force of the stepping motor shaft. Thus, the followability is not degraded unlike the unfastened ball of a related-art example, and therefore the cylindrical body 11 reliably moves in accordance with the displacement of the motor shaft. Thus, the ball is prevented from failing to return in accordance with the shortening of the shaft length of the stepping motor (followability of the ball is prevented from being degraded).

As illustrated in FIG. 5, the gap 18 as described above is formed between the both end portions of the cylindrical body 11 formed into the cylindrical shape by the press working. Further, on the both end portions around the gap 18 formed between the both end portions of the cylindrical body 11, concave portions 19 for stably fixing the cutout groove 17 of the shaft 10 and convex portions 20 for holding the shaft 10 so as to prevent the assembled (sandwiched) shaft 10 from falling off are formed.

Here, defining a gap amount between the concave portions 19 as A, a diameter of the shaft 10 at the cutout groove 17 (diameter of a bottom portion of the cutout groove) as B, and a gap amount between the convex portions 20 opposed to each other as C, it is suitable that the axis adjustment mechanism be manufactured so that a magnitude relationship between values (A, B, C) is as follows.

A>B>C

As illustrated on the right in FIG. 5, for assembling (inserting) the shaft 10 into the gap 18, the shaft 10 is gradually moved from one side so that the cutout groove 17 of the shaft 10 is fitted into the gap 18 formed between the both end portions of the cylindrical body 11. The shaft 10 is then pressed with application of a sufficient load so as to increase the gap amount C between the convex portions 20, and is guided to the concave portions 19.

Therefore, opening portions 21 are respectively formed in the both end portions of the cylindrical body 11 formed into the cylindrical shape by the press working so as to provide appropriate elasticity to the both end portions of the cylindrical body 11. In this manner, when the shaft 10 is pressed into the gap 18, the gap amount between the convex portions 20 opposed to each other is increased even with application of a smaller load. As a result, the assembly can be achieved in a simpler manner to enable improvement of ease of assembly when the shaft 10 is assembled between the both end portions (into the gap portion) of the cylindrical body 11 formed into the cylindrical shape by the press working.

Thus, in the axis adjustment mechanism (FIG. 5) described in Embodiment 1, even when the radar casing is subjected to a large shock, the cylindrical body 11 is fastened to (is prevented from being removed from) the motor shaft. Thus, the cylindrical body 11 does not fall off.

As described above, in the axis adjustment mechanism described in Embodiment 1, a backlash (gap) is present between the cylindrical body 11 and the shaft 10 as illustrated in FIG. 3 and FIG. 4 (side views) as well as illustrated in FIG. 5 (front view). Thus, even when a manufacture error of each of the components and an assembly error are generated, the errors are absorbed by the backlash (gap) described above. Thus, higher processing accuracy and assembly accuracy are not required in production steps. Thus, production facilities having higher reliability can be achieved at low cost.

Further, a case where there is provided a single fastened portion (hooked portion) between the above-mentioned cylindrical body 11 formed into the cylindrical shape by the press working and the shaft 10 has been described above. When the number of fastened portions (hooked portions) is one, however, there is a possibility that the cylindrical body 11 may oscillate due to the backlash in the fastening portion to make the drive unstable. Thus, it is preferable that a plurality of fastened portions be provided.

Next, roles and effects of the slope 16 formed on an end portion of the protruding portion 13 formed on a back surface of the board case 12 in an operation mechanism of the above-mentioned axis adjustment mechanism that is the radiation-direction changing and maintaining means are quantitatively described with reference to FIG. 8.

First, a force $F_1$ illustrated in FIG. 8 is a force of the compression spring 9 to push the board case 12. A value of $F_1$ [N] is a spring reaction force determined by a spring constant k [N/mm] and a spring compression amount $\delta$ [mm], as expressed by the following expression.

$$F_1 = k \cdot \delta \quad \text{(Expression 1)}$$

Further, the spring reaction force $F_1$ is a force that causes the board case 12 to be turned about the turning center portions 7 as the center, as described above. A moment $M_1$ [N·mm] of the spring reaction force $F_1$ is expressed by a product of the force $F_1$ and a distance $r_1$ [mm] from a point of effort at which the force $F_1$ is applied to the board case 12 to the turning center portions 7, as expressed by the following expression.

$$M_1 = F_1 \cdot r_1 \quad \text{(Expression 2)}$$

Meanwhile, as illustrated in FIG. 8, on the side of the board case 12, which is opposite to the side where the compression spring 9 is provided across the turning center portions 7, the cylindrical body 11 is arranged so as to be held in contact with the protruding portion 13 formed on the board case 12. The moment $M_1$ generated by the spring load of the compression spring 9, which causes the board case 12 to be turned, is transmitted to the opposite side of the board case 12 through the turning center portions 7. As a result, a load $F_2$ that causes movement of the cylindrical body 11 is generated by the protruding portion 13.

The load $F_2$ is generated by the protruding portion 13 for the cylindrical body 11 in a perpendicular (normal) direction to the slope 16 of the protruding portion 13, as illustrated in FIG. 8. Therefore, the load $F_2$ can be decomposed into a component force $F_{2V}$ in a direction perpendicular to a board surface 17 of the board case 12 and a component force $F_{2H}$ in a direction parallel to the board surface 17.

First, a magnitude of the component force $F_{2V}$ of the load $F_2$, which is in the direction perpendicular to the board surface 17, can be expressed by Expression 3 for a magnitude of the load $F_2$ when an angle formed between the slope of the protruding portion 13 and the board surface 17 is defined as $\theta$ [deg].

$$F_{2V} = F_2 \cdot \cos\theta \quad \text{(Expression 3)}$$

The component force $F_{2V}$ expressed by Expression 3 is a component of the load applied from the board case 12 to the cylindrical body 11 in the direction perpendicular to the board surface 17. As a counteraction to the load $F_{2V}$, a load $F_{2V}'$ for pushing back the board case 12 from the cylindrical body 11 exists. The load $F_{2V}'$ is a force that causes the board case 12 to be turned in a direction opposite to the direction of the force $F_1$ generated by the spring load of the compression spring 9.

A moment $M_2$ [N·mm] generated by the force $F_{2V}'$ is expressed by a product of the force $F_{2V}'$ and a distance $r_2$ [mm] from a point of effort at which the force $F_{2V}'$ is applied to the board case 12 to the turning center portions 7, as expressed by the following expression.

$$M_2 = F_{2V}' \cdot r_2 \quad \text{(Expression 4)}$$

Although the moment $M_1$ that causes the board case 12 to be turned by the load $F_1$ generated by the spring reaction force of the compression spring 9 and the moment $M_2$ that causes the board case 12 to be turned by the load $F_{2V}'$ for pushing back the board case 12 from the cylindrical body 11 act in the opposite directions, the magnitude of the moment $M_1$ and the magnitude of the moment $M_2$ are the same. Therefore, the attitude and the angular direction of the board case 12 can be maintained in a stationary state.

Meanwhile, a magnitude of the component force $F_{2H}$ of the load $F_2$ in the direction parallel to the board surface 17 can be expressed by the following expression for the magnitude of the load $F_{2V}$ that increases along with increase in the spring reaction force $F_1$ of the compression spring 9 as described above when the angle formed between the slope 16 formed on the protruding portion 13 and the board surface 17 is defined as $\theta$ [deg].

$$F_{2H} = F_{2V} \cdot \tan\theta \quad \text{(Expression 5)}$$

Therefore, from Expression (5), the force $F_{2H}$ generated by the spring reaction force of the compression spring 9 is reduced owing to the formation of the slope 16 on the protruding portion 13 of the board case 12, which means that the force $F_{2H}$ is applied to the cylindrical body 11 after being reduced as an angle of the slope 16 of the protruding portion 13 formed on the board case 12 becomes smaller.

The load $F_{2H}$ expressed by Expression (5) is a load that causes movement of the cylindrical body 11 in a direction parallel to the board surface 17 by the protruding portion 13 formed on the board case 12. The load is transmitted to the shaft 10 of the stepping motor 8. The load $F_{2H}$ input to the shaft 10 is referred to as "thrust load" (or "axial load") to the motor.

The stepping motor 8 constructs a screw feed mechanism configured to achieve a function of converting original turning movement generated by the motor into linear movement. The screw feed mechanism includes a rotor (female thread) and a shaft (male thread).

Thus, when the stepping motor 8 is not driven electrically and hence electromagnets inside the motor are not excited, an electromagnetic force is not generated inside the motor. Thus, the load $F_{2H}$ that is the above-mentioned thrust load is received only by the rotor (female thread) portion inside the stepping motor 8 so as to keep a screw feed amount (shaft length).

When the thrust load is too large, however, there is a fear in that a material of the rotor (female thread) portion creeps to change the screw feed amount (shaft length).

Therefore, it is desired that the thrust load be sufficiently smaller than a thrust load tolerance determined by creep performance of the material inside the stepping motor 8.

In this embodiment, the load $F_{2H}$ input to the shaft 10 by the protruding portion 13 formed on the board case 12 and the slope 16 of the protruding portion 13 is input to the shaft 10 of the stepping motor 8 as the thrust load to the motor as a component decomposed and reduced depending on the angle of the slope 16, as expressed by Expression (5). Therefore, the spring reaction force $F_1$ of the compression spring 9 is reduced by the slope 16 of the board case 12. Even when a compression spring having a large spring modulus is used for a stable attitude of the board case 12, the load actually applied to the stepping motor 8 can be reduced.

Next, how a displacement amount of the shaft 10, which is generated by the stepping motor 8, is converted into an angular change amount of the board case 12 when the stepping motor 8 is electrically driven to excite the internal electromagnets to generate the motor power is quantitatively described.

First, when the shaft 10 of the stepping motor 8 is extended in length, an extension amount is defined as $\delta X_1$. As a result of extension of the shaft 10, the cylindrical body 11 is displaced toward the slope 16 by $\delta X_1$. With the movement of the cylindrical body 11, the side of the board case 12 where the protruding portion 13 is formed is pushed up about a contact point of the cylindrical body 11 on the slope 16 as the point of effort. As a result, the board case 12 causes counterclockwise turning movement about the turning center portions 7 as a center of turning.

Here, the amount of upward displacement of the board case 12 based on the contact point of the cylindrical body 11 on the slope 16 as a reference is defined as $\delta Y_1$. Then, a relationship between $\delta Y_1$ and $\delta X_1$ is expressed by Expression (6).

$$\delta Y_1 = \delta X_1 \cdot \tan\theta \qquad \text{(Expression 6)}$$

As expressed by Expression (6), the amount $\delta Y_1$ of upward displacement of the board case 12 is reduced by the slope 16 of the protruding portion 13 formed on the board case 12 as compared with the extension amount $\delta X_1$ of the shaft 10.

Further, Expression (6) means that the amount $\delta Y_1$ of upward displacement of the board case 12 is reduced as the angle of the slope 16 becomes smaller.

Therefore, the angular change amount $\delta\theta$ of the board case 12, which is obtained through the extension of the shaft 10 by the amount $\delta X_1$, is expressed by Expression (7).

$$\delta\theta = \tan^{-1}(\delta Y_1/r_2) \qquad \text{(Expression 7)}$$

As expressed by Expression (7), the angular change amount $\delta\theta$ of the board case 12 is determined not by the extension amount $\delta X_1$ of the shaft 10 but by the amount $\delta Y_1$ reduced by the slope 16. Therefore, Expression (7) means that an angular change with resolution higher than the extension amount $\delta X_1$ per step of the shaft 10 included in the stepping motor 8, that is, resolution higher than resolution of the stepping motor 8 is obtained owing to the slope 16.

As described above, in the example of this embodiment, the angle of the board can be driven with the resolution higher than the resolution of the stepping motor 8 owing to the slope 16 of the protruding portion 13 formed on the board case 12. The direction changer is configured to change a direction of the power generated by the linear-movement generator toward the wave energy radiating means. Thus, an angle of the wave energy radiating means can be driven with high resolution. Further, a load of the force applying member is transmitted to the linear-movement generator via the direction changer. Thus, a load on the linear-movement generator can be reduced.

Based on the description given above, according to the wave energy radiating apparatus of Embodiment 1, the following excellent functions and effects are obtained.

(A1) The stepping motor 8 can be installed in a direction parallel to the printed board 3. Thus, the product can be reduced in size.

(B1) The angle of the printed board 3 can be driven with resolution higher than the resolution of the stepping motor 8.

(C1) Even when the compression spring 9 having a large spring modulus is used for a stable attitude of the board case 12, the load actually applied to the stepping motor 8 can be reduced.

(D1) The shaft of the stepping motor and the movable component are fastened to each other (or hooked). Thus, even when a foreign substance gets caught inside or a flaw is generated on the surface of the component, the wave energy radiating apparatus is forcibly driven by the thrust force of the stepping motor shaft. Thus, the followability of the ball is prevented from being degraded unlike the ball method.

(E1) The shaft of the stepping motor and the movable component are fastened to each other (or hooked). Thus, even when a large shock is applied, the ball does not falloff unlike the ball method.

Although the in-vehicle radio-wave radar apparatus has been described as the wave energy radiating apparatus in the embodiment described above, the present invention is also applicable to, for example, laser radar apparatus configured to detect an obstacle by using a laser beam and sensor apparatus configured to transmit and receive a light beam including visible light, an electromagnetic wave, such as a radio wave, and an ultrasonic wave.

What is claimed is:

1. A wave energy radiating apparatus, comprising:
an antenna board comprising a first surface and a second surface opposite the first surface;
an antenna which is provided on the first surface and configured to radiate wave energy;
a motor, which is provided in an area adjacent to the second surface of the antenna board opposite to the first surface of the antenna board from which the wave energy is radiated, the motor being configured to generate mechanical power;
a shaft connected to the motor, the shaft being configured to reciprocate in a linear motion based on the mechanical power generated by the motor;
a cylindrical body coupled to a distal end portion of the shaft;
a direction changer, which is provided so as to face the cylindrical body, and is configured to change the linear motion of the shaft into force directed toward the second surface of the antenna board to thereby turn the antenna board; and
a force applying member configured to apply a force to the antenna board in a direction opposite to the force applied by the direction changer,
wherein a cutout groove is formed at the distal end portion of the shaft,
wherein the cylindrical body is oriented lengthwise in a direction perpendicular to the linear motion, and comprises a gap extending along the cylindrical body in the direction, the gap defining two end portions comprising semicircular openings that face each other; and
wherein the cutout groove is configured to fit within the semicircular openings so that the shaft is coupled to the cylindrical body, and the cutout groove has a diameter smaller than a diameter of a circle formed by the semicircular openings so that the cutout groove can move within the semicircular openings.

2. A wave energy radiating apparatus according to claim 1, further comprising:
a board case on which the antenna board is provided, the board case comprising a turning center portion about which the board case and the antenna board are configured to rotate in response to the force applied by the direction changer; and
a plurality of antenna elements arranged on a surface of the antenna board, wherein
the direction changer is provided at one end portion of the board case, and is configured to change the linear motion of the shaft to the force turning the board case about the turning center portion; and
the force applying member comprises a compression spring provided at another end portion of the board case.

3. A wave energy radiating apparatus according to claim 2, wherein the motor comprises a stepping motor.

4. A wave energy radiating apparatus according to claim 2, wherein the direction changer comprises a protruding portion that has a slope and is formed on the board case.

5. A wave energy radiating apparatus according to claim 1, wherein the gap extends to one side of the cylindrical body to form an opening that is configured to receive the cutout groove and guide the cutout groove to the semicircular openings.

6. A wave energy radiating apparatus according to claim 1, wherein the wave energy radiating apparatus comprises an in-vehicle radio-wave radar apparatus.

* * * * *